United States Patent [19]
Wheat

[11] Patent Number: 4,853,555
[45] Date of Patent: Aug. 1, 1989

[54] ELECTRICAL POWER TRANSFER SYSTEM FOR AIRCRAFT PASSENGER ENTERTAINMENT SYSTEM

[75] Inventor: Lawrence M. Wheat, Kent, Wash.
[73] Assignee: The Boeing Company, Seattle, Wash.
[21] Appl. No.: 184,226
[22] Filed: Apr. 21, 1988
[51] Int. Cl.⁴ .............................................. H04B 5/00
[52] U.S. Cl. ................................... 307/9.1; 307/149; 307/10.1; 455/3; 455/57; 174/82
[58] Field of Search .................. 307/9, 147, 148, 149, 307/150, 10 R; 455/3, 41, 57, 77; 336/212; 379/55; 340/310 R; 174/82

[56] References Cited
U.S. PATENT DOCUMENTS

| | | | |
|---|---|---|---|
| 3,401,469 | 9/1968 | Shaver et al. | 455/57 X |
| 3,553,675 | 1/1971 | Shaver et al. | 455/3 X |
| 4,428,078 | 1/1984 | Kud | 455/3 |
| 4,736,452 | 4/1988 | Daniels et al. | 455/3 |
| 4,763,360 | 8/1988 | Daniels et al. | 455/3 |

Primary Examiner—William M. Shoop, Jr.
Assistant Examiner—Paul Ip
Attorney, Agent, or Firm—Conrad O. Gardner; B. A. Donahue

[57] ABSTRACT

A conductor rail assembly parallel to an aircraft passenger seat track is coupled by direct electrical connection to the aircraft passenger entertainment system power supply. Passenger seat entertainment system power connectors are inserted into and retained in the conductor rail assembly to distribute power to the individual seat receivers.

5 Claims, 2 Drawing Sheets

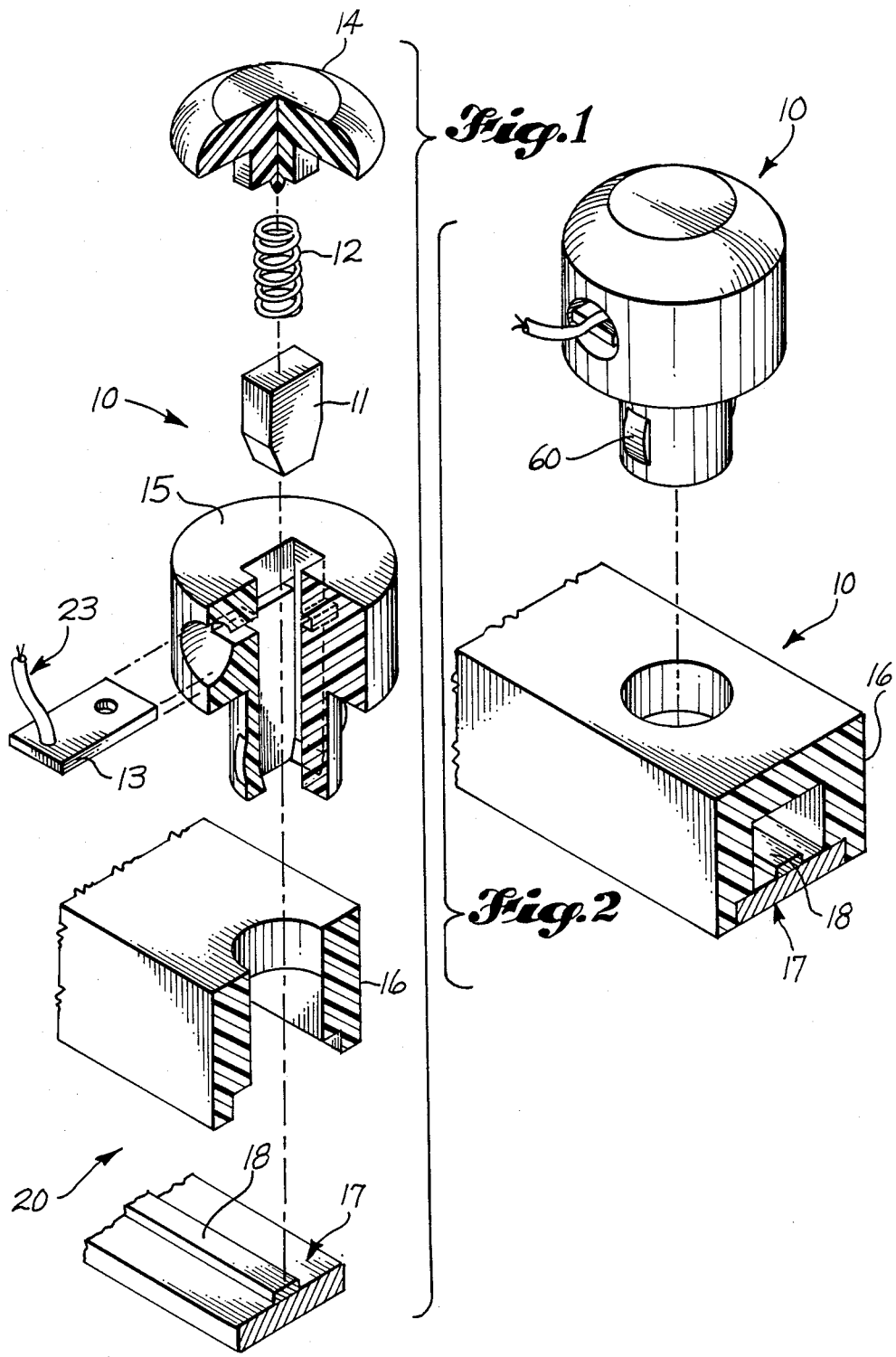

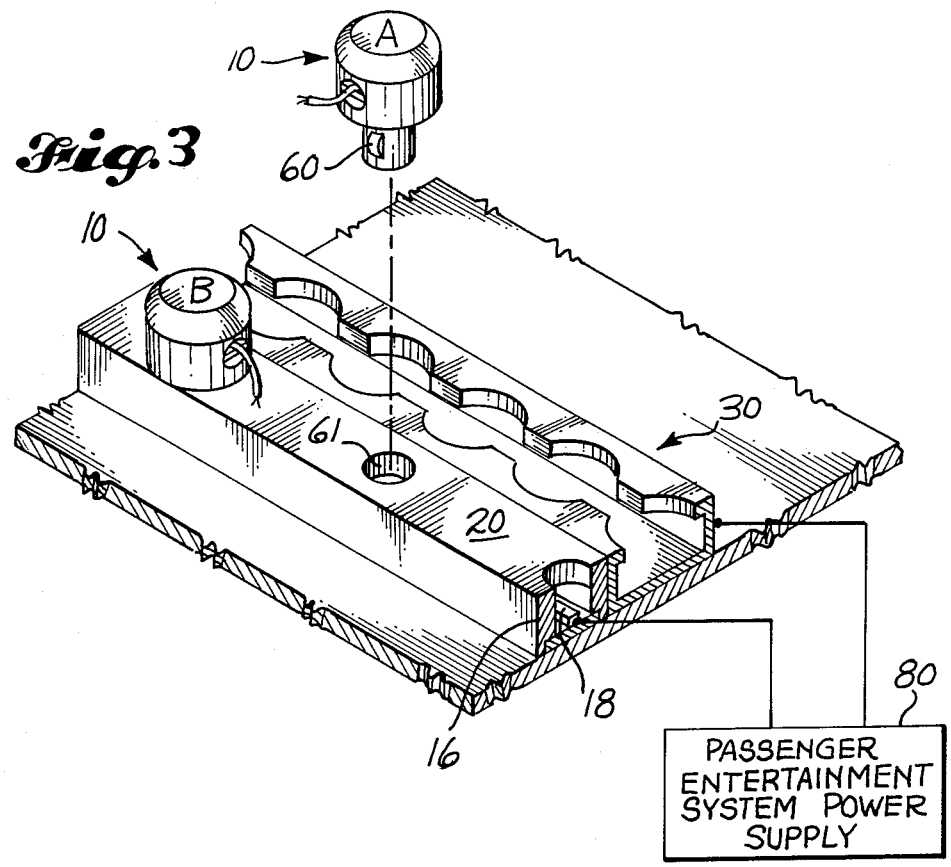

4,853,555

ELECTRICAL POWER TRANSFER SYSTEM FOR AIRCRAFT PASSENGER ENTERTAINMENT SYSTEM

BACKGROUND OF THE INVENTION

The present invention relates to passenger entertainment systems, and more particularly, to power transfer to individual seat units from the passenger entertainment system power supply.

SUMMARY OF THE INVENTION

Heretofore the aircraft passenger seat track itself has been utilized for distribution of power to the individual seat receivers as seen in copending application Ser. No. 908,449, filed Sept. 17, 1986, and assigned to the common assignee, The Boeing Company.

In contrast the present electrical power transfer system, in accordance with a preferred embodiment thereof utilizes a conductor rail assembly external to the aircraft Passenger seat track in which the conductor rail assembly includes an enclosed conductive strip for making electrical contact to each of a plurality of passenger seat entertainment system power connectors which are inserted into the conductor rail assembly in order to provide power to the individual passenger seat entertainment system units.

An object accordingly of the present invention is to Provide individual passenger entertainment system power connectors which can be plugged into a conductor rail assembly running parallel to the seat track in the aircraft cabin.

It is a further object of the present invention to Provide passenger seat entertainment system power connectors which can be inserted into a conductor rail assembly and through a 90 degree turn locked into place in a manner ensuring a wiping electrical contact to a conductive strip housed in the conductor rail assembly. It is yet another object of the present invention to provide a passenger seat entertainment system power connector as hereinbefore described which may be removed by simple 90 degree rotation thereby permitting withdrawal of the passenger seat entertainment system per connector from the conductor rail assembly.

BRIEF DESCRIPTION OF THE DRAWINGS

Other objects, advantages and features of the present invention will become apparent from the following detailed description taken in conjunction with the drawings, in which:

FIG. 1 is an exploded isometric view showing component parts of the present electrical power transfer system which includes passenger seat entertainment system power connectors, and a conductor rail assembly;

FIG. 2 is an isometric view of the present electrical power transfer system showing the passenger seat entertainment system power connector prior to insertion into the conductor rail assembly; and, FIG. 3 is an isometric view showing the relationship of the passenger seat track to the conductor rail assembly, and further showing a passenger seat entertainment system power connector prior to insertion and a passenger seat entertainment system power connector subsequent to insertion in the present conductor rail assembly.

DESCRIPTION OF THE PREFERRED EMBODIMENTS

Turning now to FIG. 1 it can be seen that the present electrical power transfer system comprises a passenger seat entertainment system power connector 10 and a conductor rail assembly 20, also shown as system components in FIG. 2. In FIG. 3 the system components comprising the passenger seat entertainment system power connectors 10 and conductor rail assembly 20 are shown in perspective with the seat track 30, where the letter A is representative of a passenger seat entertainment system power connector prior to insertion into the conductor rail assembly 20 and letter B denotes a passenger seat entertainment system power connector 10 subsequent to insertion in the conductor rail assembly 20.

Returning now to FIG. 1, the present electrical power transfer system for aircraft passenger seat units is shown to include the passenger seat entertainment system power connector 10 including a molded carbon electrical contact 11, a copper conductive spring 12 for providing contact tension and electrical conduction, a copper wire retainer 13 for maintaining electrical connection to seat power conductor 3. Passenger seat entertainment system power connector 10 is further seen to include a polycarbonate injection molded wire retainer member 14 which is press fit into passenger seat entertainment system body housing member 15 also being polycarbonate injection molded.

Conductor rail assembly 20 is seen to include an insulated rail housing member 16 which may be extruded from polycarbonate with ¼ inch holes distributed there along. The bottom portion of conductor rail assembly 20 comprises a printed circuit board member 17 having a conductive strip portion 18 extending there along. Turning now to FIG. 3 and a description of the operation of the present electrical power transfer system it can be seen that upon insertion of a passenger seat entertainment system power connector 10 shown at A, retaining ears 60 are collapsed upon passage through the hole 61. Also, a 90 degree turn will allow contactor ear 60 to expand under the roof of the rail thereby keeping passenger seat entertainment system power connector 10 within conductor rail assembly 20. Upon insertion of connector 10, molded carbon electrical contact 11 (as seen in FIG. 1) is Passed under pressure by spring 12 against conductive strip 18. Upon rotation of connector assembly 10 through 90 degrees the bottom surface of molded carbon electrical contact member 11 wipes against conductive strip 18 thereby maintaining good electrical contact therewith.

In order to extract the passenger seat entertainment system power connector (B), the connector is rotated through 90 degrees thereby collapsing the molded retaining ears 60 for removal of connector 10. A passenger entertainment system power supply 80 is shown coupled (as seen in FIG. 3) between conductive strip 18 and seat track member 30 in order to provide power to the individual passenger seat entertainment system power connectors 10.

What is claimed is:

1. An electrical power transfer system for an aircraft Passenger entertainment system comprising in combination:
  an aircraft passenger seat track having a plurality of apertures distributed there along for insertion of passenger seat legs; said seat track having a rectangularly shaped cross section;

a plurality of passenger seat entertainment system power connectors;

a conductor rail assembly having a plurality of apertures distributed there along for receiving said plurality of passenger seat entertainment system power connectors, said conductor rail assembly having a rectangularly shaped cross section;

a passenger entertainment system power supply;

said conductor rail assembly having an enclosed conductive strip extending along the length thereof in electrically insulated relationship with respect to said seat track;

said passenger entertainment system power supply coupled between said conductive strip and said seat track; and, said plurality of passenger seat entertainment system power connectors making electrical contact with said conductive strip.

2. The electrical power transfer system according to claim 1 wherein said conductor rail assembly comprises an electrically insulative material.

3. The electrical power transfer system according to claim 2 wherein said electrically insulative material comprises polycarbonate.

4. The electrical power transfer system according to claim 1 wherein each of said plurality of passenger seat entertainment power connectors comprises an electrically insulative housing enclosing a carbon electrical contact for making spring pressure contact with said conductive strip.

5. The electrical power transfer system according to claim 4 wherein rotation through 90 degrees of said electrically insulative housing causes wiping of said conductive strip by said carbon electrical contact.

* * * * *